US008625117B2

(12) United States Patent
Miyata (10) Patent No.: US 8,625,117 B2
(45) Date of Patent: Jan. 7, 2014

(54) APPARATUS FOR CONTROLLING IMAGE FORMATION, COMPUTER READABLE DEVICE HAVING STORED THEREON COMPUTER-EXECUTABLE INSTRUCTIONS FOR FORMING IMAGES, AND METHOD OF GENERATING IMAGE FORMATION SETTING INFORMATION (75) Inventor: Yuji Miyata, Kitanagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 159 days.

(21) Appl. No.: 13/073,266

(22) Filed: Mar. 28, 2011

(65) Prior Publication Data
US 2011/0279843 A1 Nov. 17, 2011

(30) Foreign Application Priority Data

May 17, 2010 (JP) .................................. 2010-113466

(51) Int. Cl.
*G06F 3/12* (2006.01)
(52) U.S. Cl.
USPC ........................................ 358/1.13; 358/1.15
(58) Field of Classification Search
None
See application file for complete search history.

(56) References Cited

U.S. PATENT DOCUMENTS

| 6,847,466 B1* | 1/2005 | Gazdik et al. ................ 358/1.15 |
| 7,884,952 B2 | 2/2011 | Takagi |
| 2006/0221361 A1 | 10/2006 | Takagi |
| 2007/0146759 A1* | 6/2007 | Saito .......................... 358/1.13 |

FOREIGN PATENT DOCUMENTS

| JP | 2005-148928 | | 6/2005 |
| JP | 2005-182694 | A | 7/2005 |
| JP | 2006-285870 | A | 10/2006 |
| JP | 2008-310495 | | 12/2008 |
| JP | 2009-003712 | A | 1/2009 |

OTHER PUBLICATIONS

Notification of Reasons for Refusal issued in corresponding Japanese Patent Application No. 2010-113466 dated Aug. 6, 2013.

* cited by examiner

*Primary Examiner* — Marivelisse Santiago Cordero
*Assistant Examiner* — Moustapha Diaby
(74) *Attorney, Agent, or Firm* — Banner & Witcoff, Ltd.

(57) ABSTRACT

A computer readable device has stored thereon computer-executable instructions that, when executed, cause a computer to function as a generation module, a setting module and a production module. The generation module is configured to generate a data structure including a first region storing a first image formation condition and a second region for storing location information representing a location of the second region and in which a second image formation condition is written by an application program based on the location information. The setting module is configured to set the first image formation condition in the first region based on the second image formation condition written in the second region by the application program. The production module is configured to produce image formation data based on the first image formation condition stored in the first region.

13 Claims, 10 Drawing Sheets

| Item Name | Content of Item | Setting Value |
|---|---|---|
| Input Value 1 | TWO-SIDED PRINTING | "NO CHANGE", "EXECUTION OF TWO-SIDED PRINTING", "NO EXECUTION OF TWO-SIDED PRINTING" |
| Input Value 2 | BORDERLESS PRINTING | "NO CHANGE", "EXECUTION OF BORDERLESS PRINTING", "NO EXECUTION OF BORDERLESS PRINTING" |
| Output Value 1 | WITH / WITHOUT TWO-SIDED PRINTING FUNCTION | "YES", "NO" |
| Output Value 2 | DETERMINATION RESULT | "SUCCESSFUL", "FALSE" |

APPARATUS FOR CONTROLLING IMAGE FORMATION, COMPUTER READABLE DEVICE HAVING STORED THEREON COMPUTER-EXECUTABLE INSTRUCTIONS FOR FORMING IMAGES, AND METHOD OF GENERATING IMAGE FORMATION SETTING INFORMATION

CROSS REFERENCE TO RELATED APPLICATION

The present application claims priority from Japanese Patent Application No. 2010-113466 filed on May 17, 2010. The entire content of this priority application is incorporated herein by reference.

TECHNICAL FIELD

The present disclosure relates to an apparatus for controlling image formation, a computer readable device having computer program product for forming images and a method of forming image formation setting information.

BACKGROUND

The Microsoft Windows (registered trademark) operating system provides an image formation system in which the printing condition determined according to an application program or a printer driver is stored as binary-type print setting information that is a DEVMODE data structure.

Figure 10:
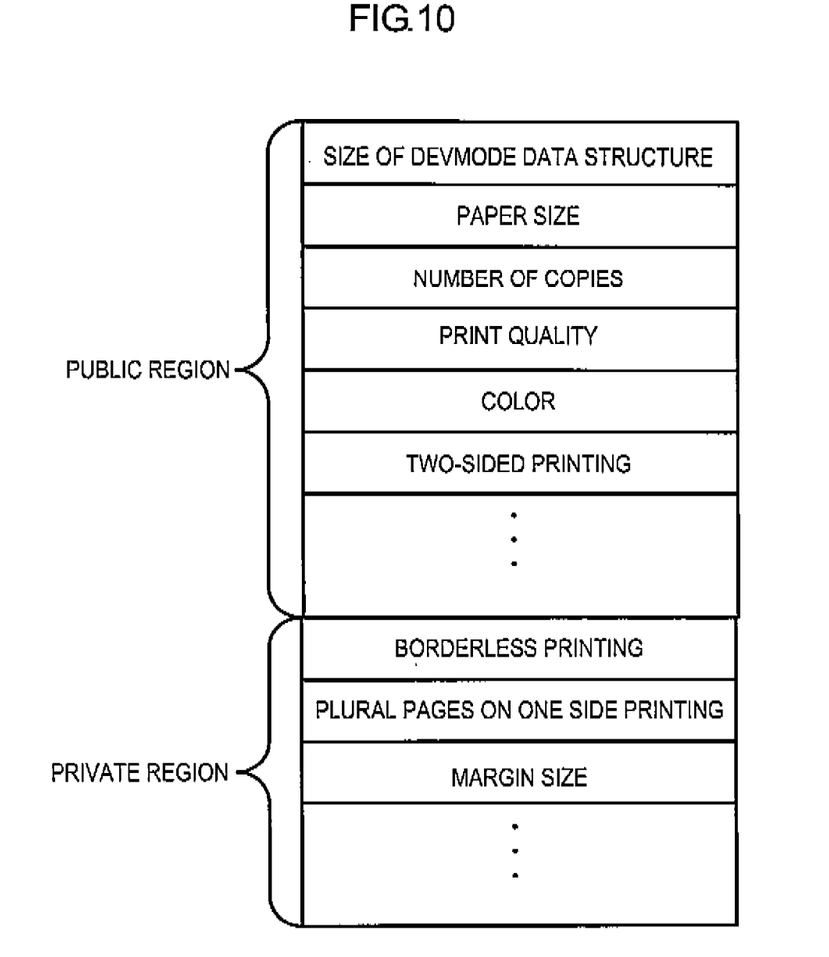
FIG. 10 is a diagram illustrating a configuration of a conventional DEVMODE data structure.

FIG. 10 is a diagram illustrating a structure of the DEVMODE data structure. The DEVMODE data structure is roughly configured by two regions. One is a Public region that is open to public, and the other is a Private region that is not open to public. The Public region stores print conditions related to basic print functions that are common to a plurality of printer types. Since the specification for the Public region is open, it is possible for a user to change the print conditions stored in the Public region through the application program.

The Private region stores print conditions related to print functions that are unique to each printer. The specification for the Private region is unique to each developer of the printer drivers. Since the specification for the Private region is not open, the print conditions stored in the Private region cannot be changed by the user through the application program.

However, the user may wish to change the print conditions stored in the Private region through the application program. In such a case, an expanding API (Application Programming Interface) is implemented in the printer driver to change the print condition stored in the Private region through the application program, and the application program calls the expanding API to change the print condition.

However, when the application program calls the expanding API to change the print condition, following problems occur.

The OS includes a 32-bit OS that handles 32-bit data and a 64-bit OS that handles 64-bit data. Similarly, the printer driver includes a 32-bit driver that handles 32-bit data and a 64-bit driver that handles 64-bit data. Only the 32-bit driver can be used on the 32-bit OS and only the 64-bit driver can used on the 64-bit OS.

Similarly, the application program includes a 32-bit application that handles 32-bit data and a 64-bit application that handles 64-bit data. Only the 32-bit application can be operated on the 32-bit OS. However, both of the 32-bit application and the 64-bit application can be operated on the 64-bit OS.

The 32-bit application cannot call the expanding API that is implemented in the 64-bit driver. Therefore, the 32-bit application that is operated on the 64-bit OS cannot change the print condition stored in the Private region.

SUMMARY

According to an aspect of the present invention, a computer readable device has stored thereon computer-executable instructions that, when executed, cause a computer to function as a generation module, a setting module and a production module. The generation module is configured to generate a data structure including a first region storing a first image formation condition and a second region for storing location information representing a location of the second region and in which a second image formation condition is written by an application program based on the location information. The setting module is configured to set the first image formation condition in the first region based on the second image formation condition written in the second region by the application program. The production module is configured to produce image formation data based on the first image formation condition stored in the first region.

BRIEF DESCRIPTION OF THE DRAWINGS

Illustrative aspects in accordance with the present invention will be described in detail with reference to the following drawings wherein.

DETAILED DESCRIPTION

<Illustrative Aspect>

An illustrative aspect of the present invention will be hereinafter explained with reference to FIGS. 1 to 9.

(1) Structure of Computer

Figure 1:
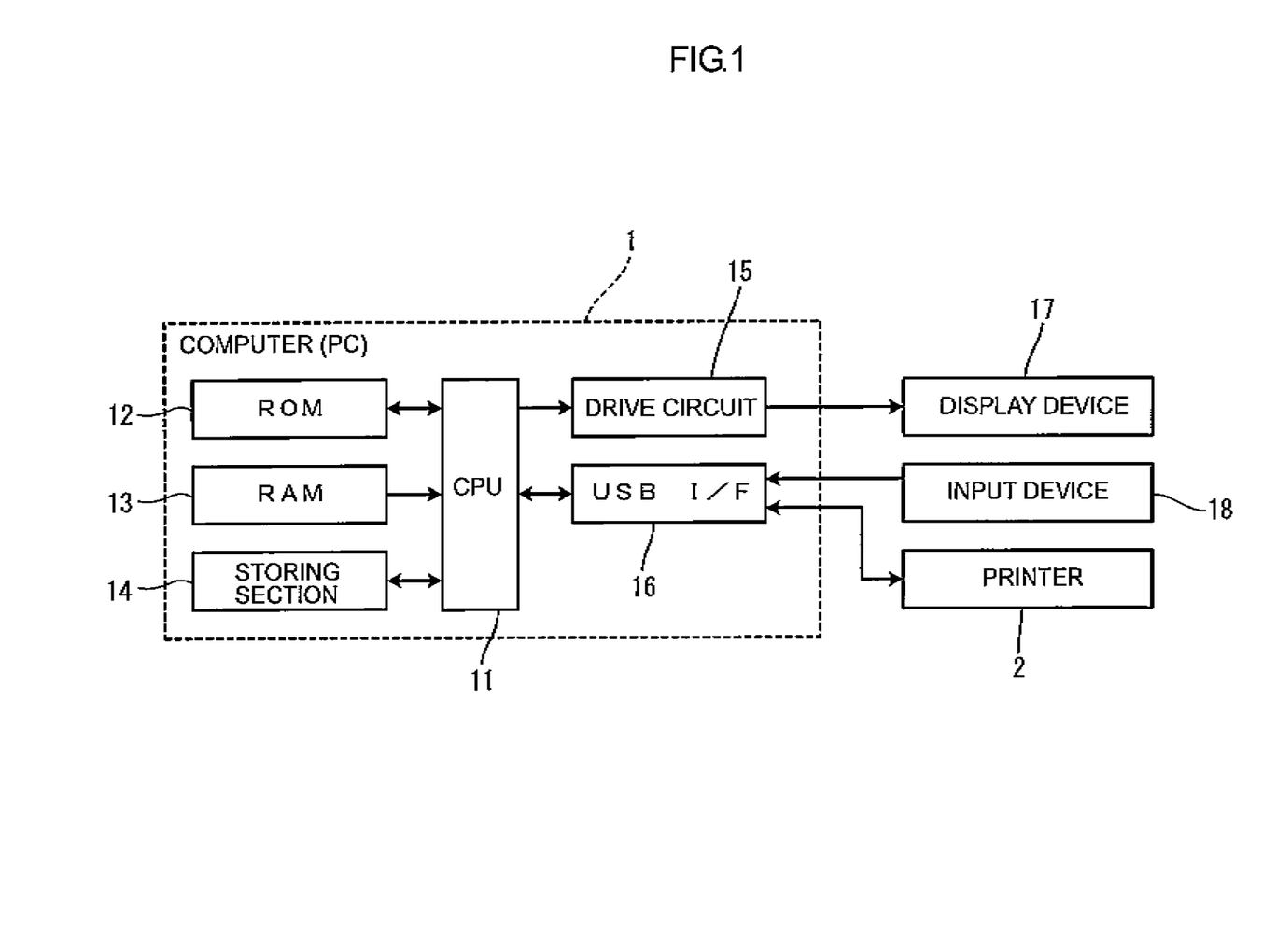
FIG. 1 is a block diagram illustrating an electrical configuration of a computer according to an illustrative aspect of the present invention.

An electrical configuration of a computer 1 (hereinafter referred to as a PC) will be explained with reference to FIG. 1. The PC 1 includes a CPU 11, a ROM 12, a RAM 13, a storing section 14, a display drive circuit 15, and a USB interface (USB I/F) 16.

The CPU 11 executes various programs stored in the ROM 12 and the storing section 14 and controls each component in the PC 1. The ROM 12 stores various programs that are executed by the CPU 11 and data. The RAM 13 is a main memory that is used when the CPU 11 executes various processes.

The storing section 14 is an external memory for storing various programs and data using a non-volatile storing medium such as a hard drive or a flash memory. The storing section 14 stores an operating system (OS), print programs such as an image forming program. The Microsoft Windows (registered trademark) operating system is used in the illustrative aspect as an example.

The display drive circuit 15 is a circuit that drives a display device 17 such as a CRT and a liquid crystal display and connected to the display device 17 via a cable.

The USB interface 16 is provided as a USB (Universal Serial Bus) host interface and connected to devices via a USB cable. The devices include the printer 2 and an input device 18 such as a mouse and a keyboard.

The printer 2 forms images on a recording medium such as a paper by an electrophotographic method or an ink jet method. The printer 2 may be connected to the PC 1 via the communication network such as LAN.

Logical Structure of Print Program

A logical structure of a print program will be explained with reference to FIG. 2. The print program 30 includes a printer driver 31 and an application program 32 (hereinafter referred to as an application). Data representing a print condition is passed between the printer driver 31 and the application 32 with using a DEVMODE data structure 40.

Various commands output from the application 32 to the printer driver 31 is transmitted to the printer driver 31 via an API that is provided by the OS. The various commands include a print command such as a GDI command or a command for setting a setting value in the Private region or the Public region based on the print condition that is written in a passing region 42 (see FIG. 3).

(2-1) DEVMODE Data Structure

Figure 3:
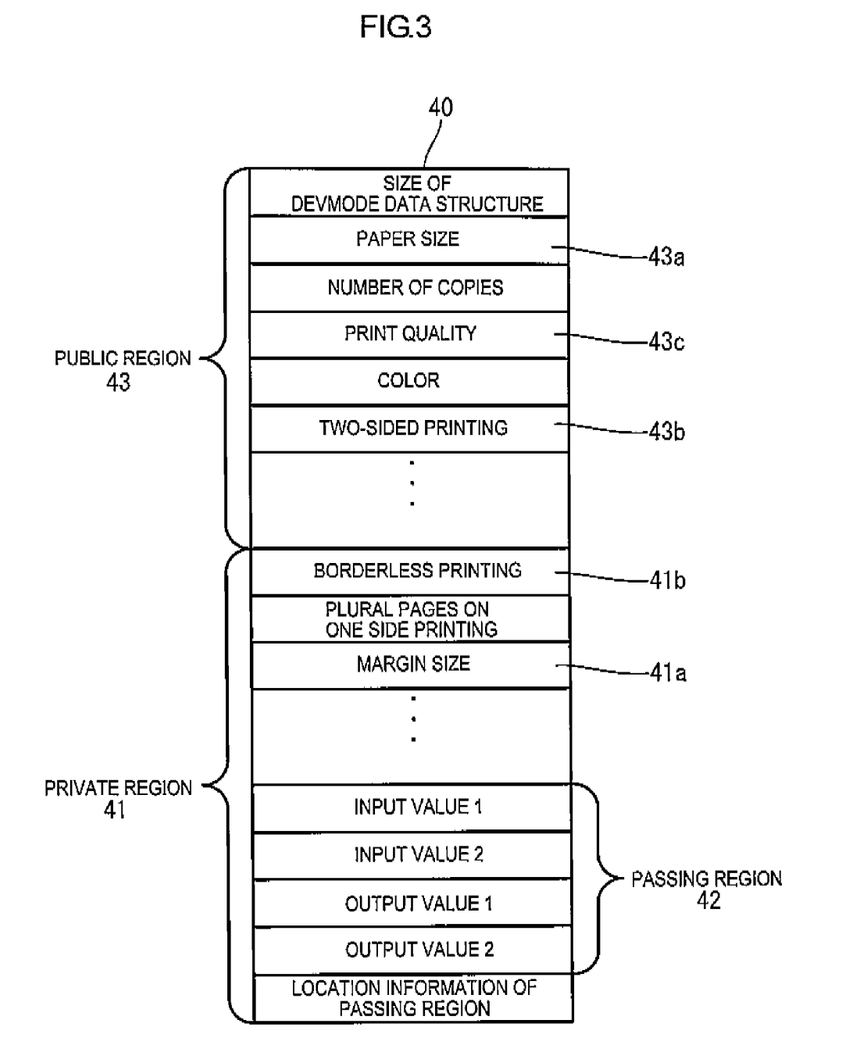
FIG. 3 is a diagram illustrating a DEVMODE data structure according to the illustrative aspect.

A structure of a DEVMODE data structure will be explained with reference to FIG. 3. The DEVMODE data structure 40 is configured by a Public region 43 and a Private region 41.

The Public region 43 stores information relating to the DEVMODE data structure itself such as a size of the DEVMODE data structure and also stores setting values for print setting items relating to basic print functions that are common to a plurality of printer types such as a paper size, the number of copies, print quality, color printing and two-sided printing. A specification of the Public region 43 is determined by Microsoft and therefore the developer of a printer driver cannot set a new item in the Public region 43.

The Private region 41 stores setting values for print setting items relating to print functions unique to the printer 2 such as borderless printing, plural pages on one side and a margin size. A specification of the Private region 41 is unique to a developer of the printer driver, and the specification of the Private region 41 is not usually open. Therefore, the print condition stored in the Private region 41 cannot be changed through the application 32.

The DEVMODE data structure 40 of the illustrative aspect is different from the conventional DEVMODE data structure in FIG. 10 in that the passing region 42 is provided in the Private region 41.

The passing region 42 is used to change the setting value of a part of the print setting items stored in the Private region 41 from the application 32. In the illustrative aspect, the setting value of "borderless printing" is changed.

The passing region 42 is used to notify the application 32 if the printer has a specific print function. In the illustrative aspect, the application 32 is notified if the printer has a two-sided printing function.

The passing region 42 is also used when the setting value that is stored in the Public region 43 is not wanted to be changed directly from the application 32. In such a case, the setting value stored in the Public region 43 is written in the passing region 42 from the application 32 and then, a setting value is set in the Public region 43 based on the setting value written in the passing region 42 by the printer driver 31. That is, the setting value in the Public region 43 is determined with reference to the setting value in the passing region 42.

When the setting value of "two-sided printing" stored in the Public region 43 is wanted to be changed in relation to the setting value of "margin size" stored in the Private region 41, the following process is executed. Specifically, when the two-sided printing is executed for a postcard-size paper, the margin size is set to 0 mm.

In such a case, the application 32 writes the setting value of "two-sided printing" in the passing region 42 so that the printer driver 31 can change the setting values of "two-sided printing" and "margin size" in relation to each other.

Location information of the passing region is stored at the end of the DEVMODE data structure 40. The application 32 acquires the end address of the DEVMODE data structure 40 from the size of the DEVMODE data structure stored in the Public region 43. The application 32 reads the location information of the passing region from the end address of the DEVMODE data structure 40 to access the passing region 42.

The passing region 42 stores values of four items including an input value 1, an input value 2, an output value 1 and an output value 2.

Figure 4:
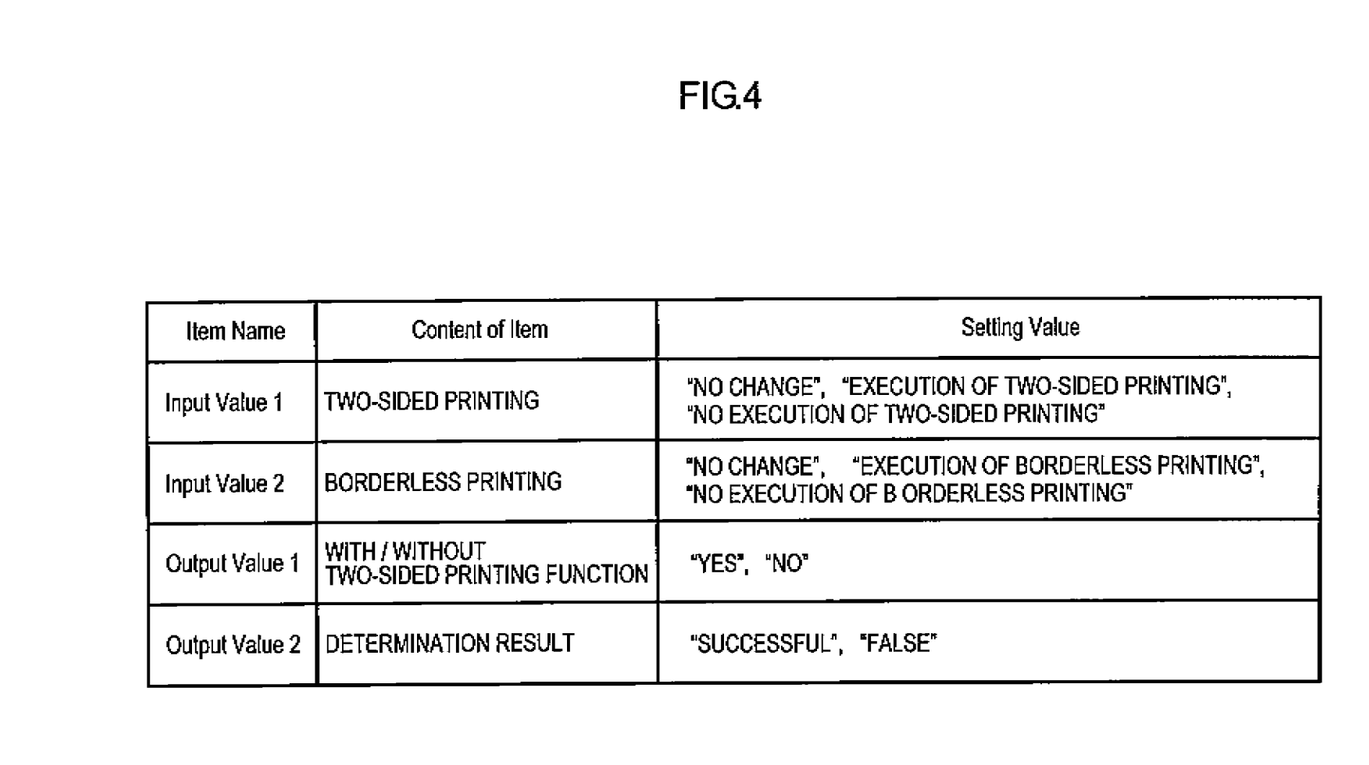
FIG. 4 is a diagram illustrating values stored in each input value and output value.

The values stored in each input value and output value will be explained with reference to FIG. 4.

The input value 1 is an item in which the application 32 writes the setting value of "two-sided printing". One of the setting values of "no change", "execution of two-sided printing" and "no-execution of two-sided printing" is written in the input value 1.

The input value 2 is an item in which the application 32 writes the setting value of "borderless printing". One of the setting values of "no change", "execution of borderless printing" and "no-execution of borderless printing" is written in the input value 2.

The input values are not limited to the setting values of "two-sided printing" and "borderless printing" but may be the setting values of other print functions if the print functions are allowed to be changed from the application. The number of items stored in the passing region 42 is not limited to two but may be arbitrarily determined.

The output value 1 is an item in which the printer driver 31 writes the print function information representing if the printer 2 is provided with a specific print function. In the illustrative aspect, the print function information represents if the printer 2 is provided with the two-sided printing function. If the printer 2 is provided with the two-sided printing function, "yes" is written in the output value 1 and if the printer 2 is not provided with the two-sided printing function, "no" is written therein. The specific print function is not limited to the two-sided printing function but may be other function if the function is provided in the printer. The number of specific print function stored in the passing region 42 is not limited to one.

The output value 2 is an item in which a determination result is written. The determination result is obtained when the printer driver 31 determines if the setting value in the input value 1 or the input value 2 is effective based on the setting values in the input value 1 or 2 and the print function of the printer. Details will be described later. The determination result is not always successful but may be false. If the determination result is successful, "effective" is written in the output value 2. If the determination result is false, "ineffective" is written therein.

(2-2) Logical Configuration of Printer Driver

Figure 2:
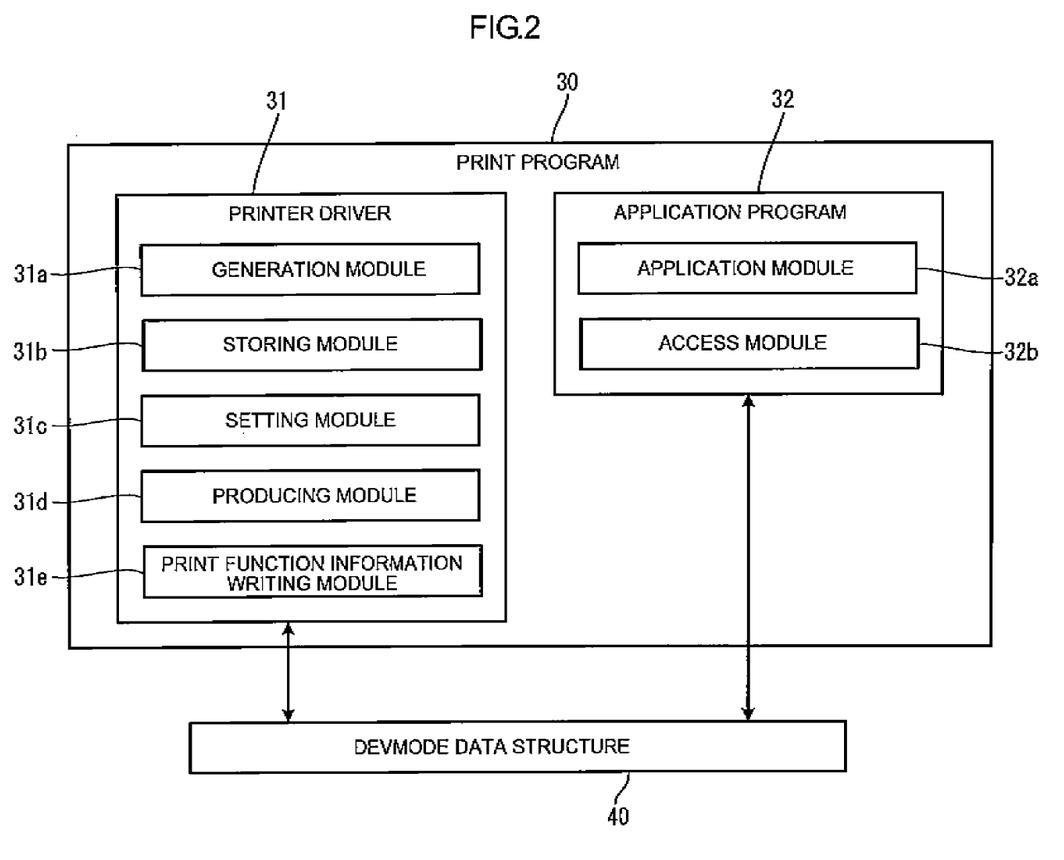
FIG. 2 is a block diagram illustrating a logical configuration of a print program.

The printer driver 31 includes a generation module 31a, a storing module 31b, a setting module 31c, a producing module 31d and a print function information writing module 31e, as illustrated in FIG. 2.

The generation module 31a is executed to generate the DEVMODE data structure 40. Specifically, the generation module 31a obtains an instance of the DEVMODE data structure (hereinafter simply referred to as a DEMVODE data structure) in the RAM 13 according to a definition code of the DEVMODE data structure.

The storing module 31b stores setting values of each print setting item in the Public region 43 and the Private region 41 of the DEVMODE data structure 40. Specifically, when the generation module 31a generates the DEVMODE data structure 40, the storing module 31b stores a predetermined default value in each print setting item of the generated DEVMODE data structure 40.

Figure 5:
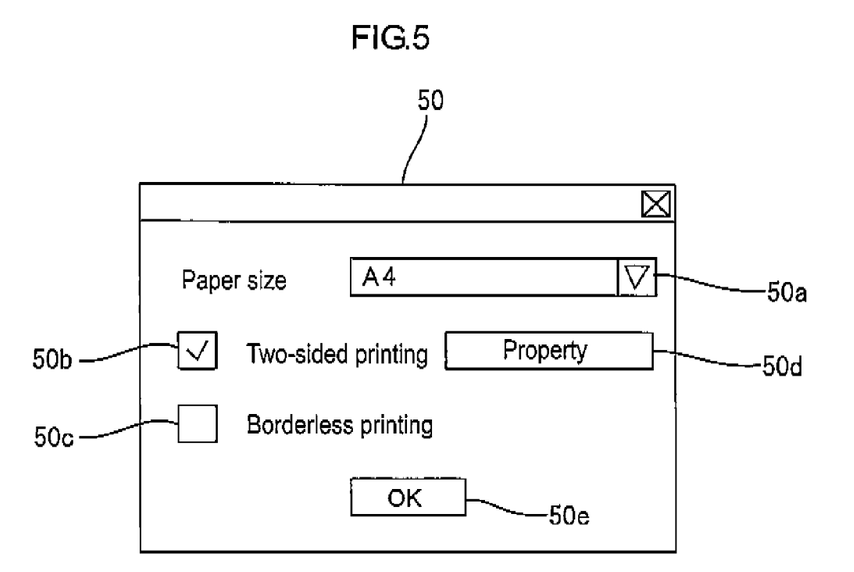
FIG. 5 is a diagram illustrating an example of an application print setting screen.

The application 32 can call the storing module 31b of the printer driver 31 from an application print setting screen 50 (see FIG. 5). The storing module 31b that is called by the application 32 displays a driver print setting screen for setting a print condition. On the driver print setting screen, the setting values stored in the Private region 41 can be changed.

The setting module 31c sets the setting values of the print condition stored in the Public region 43 and the Private region 41 based on the setting values of each print setting item that are written in the passing region 42 by the application 32.

The producing module 31d produces image formation data based on a print command output by the application 32, the print condition stored in the Public region 43 and the print condition stored in the Private region 41 and outputs the produced image formation data to the printer 2.

The print function information writing module 31e writes print function information that represents if the printer 2 is provided with a specific print function in the output value 1 of the passing region 42. In this illustrative aspect, the print function information writing module 31e writes in the output value 1 the print function information that represents if the printer 2 is provided with a two-sided printing function.

(2-3) Logical Configuration of Application Program

As described above, the setting values stored in the Private region 41 can be changed on the driver print setting screen. However, in such a case, a user is required to call the driver print setting screen from the application print setting screen 50. This increases the number of operations and this may be inconvenient to some users.

According to the illustrative aspect, the application 32 can change the setting values of the print setting items stored in the Public region 43 and also the setting values of some of the print setting items stored in the Private region 41 without calling the driver print setting screen. Specifically, the application 32 can change the setting value of "borderless printing" stored in the Private region 41 without calling the driver print setting screen.

The application 32 includes an application module 32a and an access module 32b.

The application module 32a includes a word processing software, a spreadsheet software, an image editing software and the like.

The access module 32b reads the values from the output value 1 and the output value 2 of the passing region 42 and writes the setting values in the input value 1 "two-sided printing" and in the input value 2 "borderless printing". Specifically, the access module 32b displays the application print setting screen 50 on the display device 17 and writes in the input value 1 and the input value 2 of the passing region 42 the values that are set by a user from the application print setting screen 50. In this displaying process, the access module 32b reads the values from the output value 1 and the output value 2 to control the display.

(3) Display Process of Application Print Setting Screen

The display process of the application print setting screen 50 will be explained with reference to FIG. 5. For easy understanding, three print setting items of "paper size", "two-sided printing" and "borderless printing" will be explained.

A print paper size is selected in a paper size field 50a. If a user selects a paper size in the paper size filed 50a, the selected paper size is stored in the "paper size" 43a of the Public region 43 by the application 32.

A two-sided printing field 50b is used for selecting the two-sided printing. If a user selects executing the two-sided printing, a checkbox for the two-sided printing is checked. If a user selects not executing the two-sided printing, the checkbox is cleared.

The borderless printing is selected in a borderless printing field 50c. If a user selects executing the borderless printing, a checkbox for the borderless printing is checked. If a user selects not executing the borderless printing, the checkbox is cleared.

A property button 50d is used to call the driver print setting screen.

An OK button 50e is used when a user orders execution of printing. If a user clicks the OK button 50e, the application 32 outputs a print command for printing a print object page to the printer driver 31 via an API provided by the OS. When receiving the print command, the printer driver 31 produces print data based on the print command, the print condition stored in the Public region 43 and the print condition stored in the Private region 41, and transmits the produced print data to the printer 2.

The two-sided printing field 50b is displayed on the application print setting screen 50 in FIG. 5. When displaying the application print setting screen 50, the application 32 confirms if the printer 2 is provided with the two-sided printing function. If the application 32 determines that the printer 2 does not have capability of the two-sided printing function, the two-sided printing field 50b is not displayed. The borderless printing field 50e may always be displayed. Hereinafter, the display process of the application print setting screen 50 will be explained.

Figure 6:
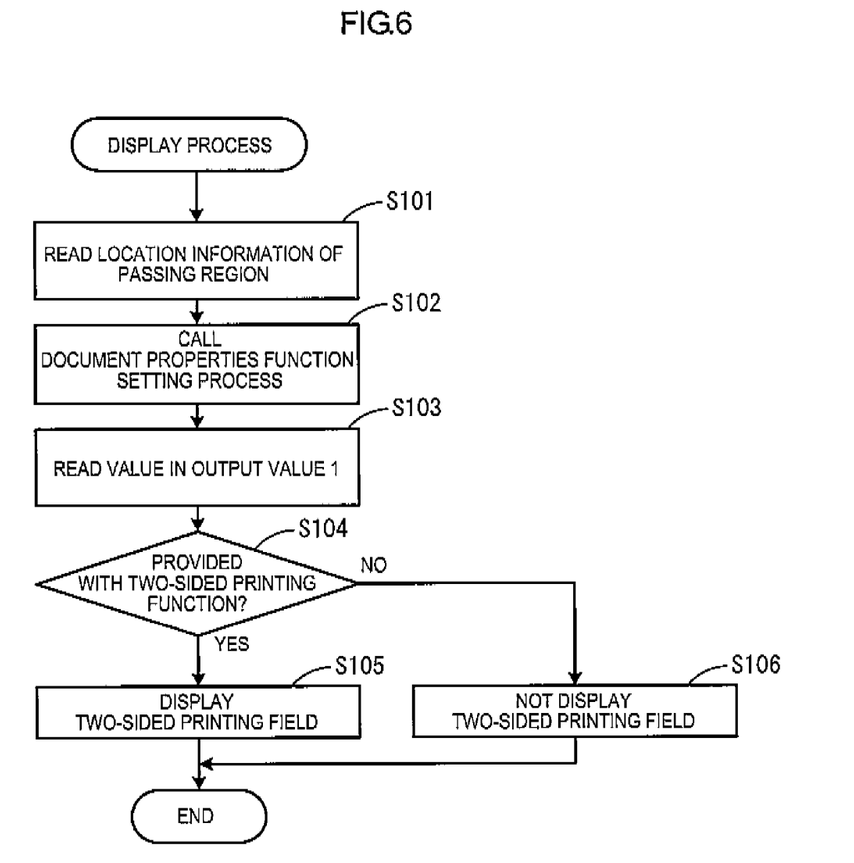
FIG. 6 is a flowchart illustrating a flow of a display process of the application print setting screen.

A flow of the display process of the application print setting screen 50 will be explained with reference to FIG. 6.

If a user selects "print" from a menu displayed by the application 32, the application 32 requests the printer driver 31 via the OS to acquire a pointer of the DEVMODE data structure 40. The pointer represents an address on a memory.

The printer driver 31 that is requested to provide the pointer generates the DEVMODE data structure 40 and stores predetermined default values therein. The printer driver 31 returns the pointer of the DEVMODE data structure 40 to the application 32 as a return value. "No change" is set in the input value 1 and the input value 2 as default values and no value is set in the output value 1 and the output value 2.

If the pointer of the DEVMODE data structure 40 is returned to the application 32 from the printer driver 31, the following display process starts.

Hereinafter, the CPU 11 that executes the application 32 will be referred to as the application 32. The CPU 11 that executes the printer driver 31 will be referred to as the printer driver 31. At step S101, the application 32 reads the location information of the passing region from the end of the DEV-MODE data structure 40. Thus, the application 32 reads the location information of the passing region to specify the location of the passing region 42. Therefore, even if the passing region 42 is provided in the Private region 41, the application 32 can read and write data from/in the passing region 42. The end address of the DEVMODE data structure 40 can be specified by the size of the DEVMODE data structure stored in the Public region (FIG. 3) and a beginning address of the DEVMODE data structure.

At step S102, the application 32 calls Document Properties Function that is an API provided by the OS. Then, the OS calls Dry Document Properties Function that is provided by the printer driver 31. When the Dry Document Properties Function is called, the printer driver 31 executes a setting process. Details will be described later. In the setting process, the printer driver 31 writes in the output value 1 of the DEVMODE data structure 40 the data representing if the printer 2 is capable of the two-sided printing function.

At step S103, the application 32 reads from the passing region 42 the value of the output value 1 that represents if the printer 2 is capable of the two-sided printing function.

At step S104, the application 32 determines if the printer 2 is capable of the two-sided printing function based on the value of the output value 1. If the determination is affirmative, the process proceeds to step S105. If the determination is negative, the process proceeds to step S106.

At step S105, the application 32 displays the application print setting screen 50 and also displays the two-sided printing field 50b thereon.

At step S106, the application 32 displays the application print setting screen 50 and does not display the two-sided printing field 50b thereon.

(4) Change of Print Condition from Application Program

Figure 7:
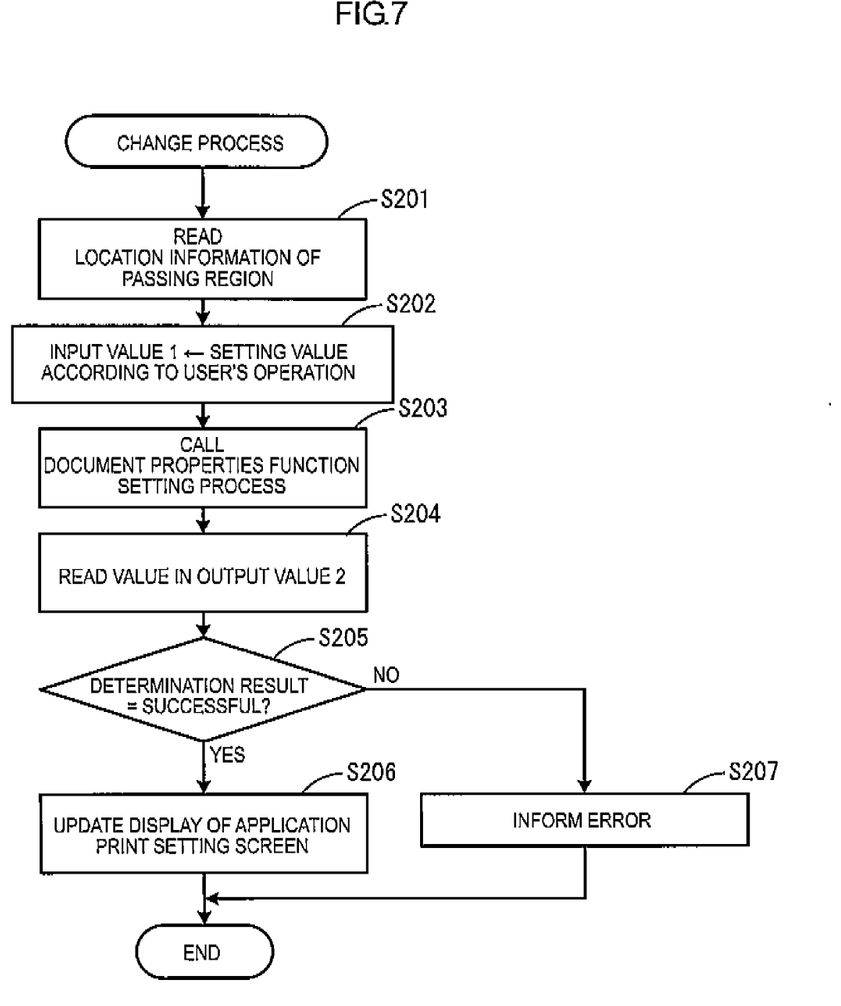
FIG. 7 is a flowchart illustrating a flow for changing the print condition from the application.

A process flow for changing the print condition from the application 32 will be explained with reference to FIG. 7. In the illustrative aspect, the printer 2 is capable of the two-sided printing function and a user changes the setting value of the "two-sided printing" on the application print setting screen 50. The similar process is executed when a user changes the setting value of the "borderless printing". This process is started when a user checks the checkbox for the two-sided printing field 50b on the application print setting screen 50 or when a user clears the checkbox for the two-sided printing field 50b.

At step S201, the application 32 reads the location information of the passing region from the end of the DEVMODE data structure 40.

At step S202, according to the operation by the user, the application 32 writes the setting value in the input value 1 of the passing region 42 that represents if the two-sided printing is executed.

Specifically, for example, if a user clicks the empty checkbox, the checkbox is now checked and the application 32 writes "execution of two-sided printing" in the input value 1. On the other hand, if a user clicks the checked checkbox, the checkbox is now cleared and the application 32 writes "no-execution of two-sided printing" in the input value 1.

At step S203, the application 32 calls the Document Properties Function. When the Document Properties Function is called, the printer driver 31 executes the setting process. Details will be described later. In the setting process, the printer driver 31 determines if the value written in the input value 1 is effective and writes the determination result in the output value 2 of the passing region 42. The printer driver 31 sets the setting values in the Public region 43 and the Private region 41 based on the determination result.

At step 204, the application 32 reads the value of the output value 2 from the passing region 42 that represents if the determination result is successful or false.

If the determination result is successful at step S205, the process proceeds to step S206 and if the determination result is false, the process proceeds to step S207.

At step S206, the application 32 updates the display of the application print setting screen 50. Specifically, if the check mark is not displayed in the checkbox of the two-sided printing field 50b, the application 32 displays the check mark therein. If the check mark is displayed in the checkbox of the two-sided printing field 50b, the checkbox is cleared.

At step S207, the application 32 informs a user that the setting value input by a user is ineffective. For example, an error message of "selected setting is unavailable" is displayed on the display device 17. If the setting value input by a user is ineffective, the check mark is not displayed in the checkbox of the two-sided printing field 50b even if the user checks the checkbox at the beginning of this process.

(5) Setting Process

Figure 9:
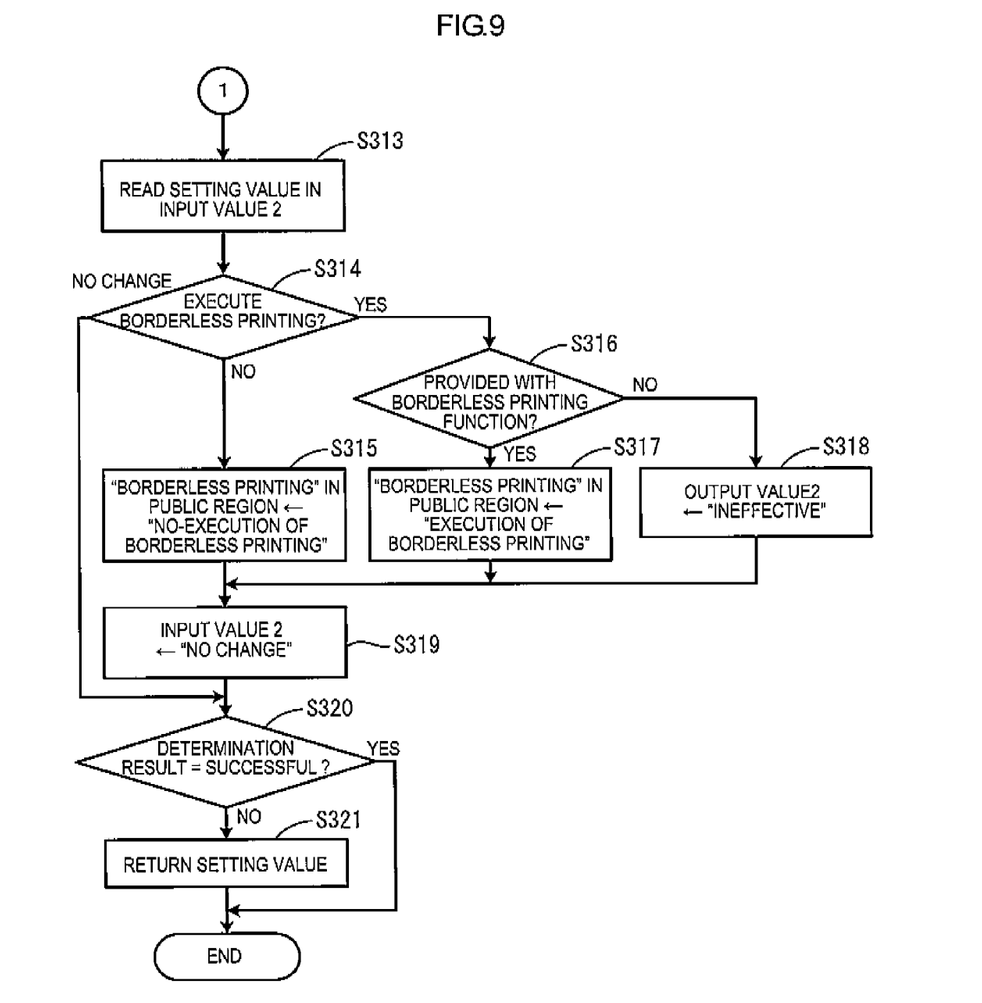
FIG. 9 is a flowchart illustrating a flow of the setting process.

A flow of the setting process executed in step S102 and step S203 will be explained with reference to FIGS. 5 and 9.

Figure 8:
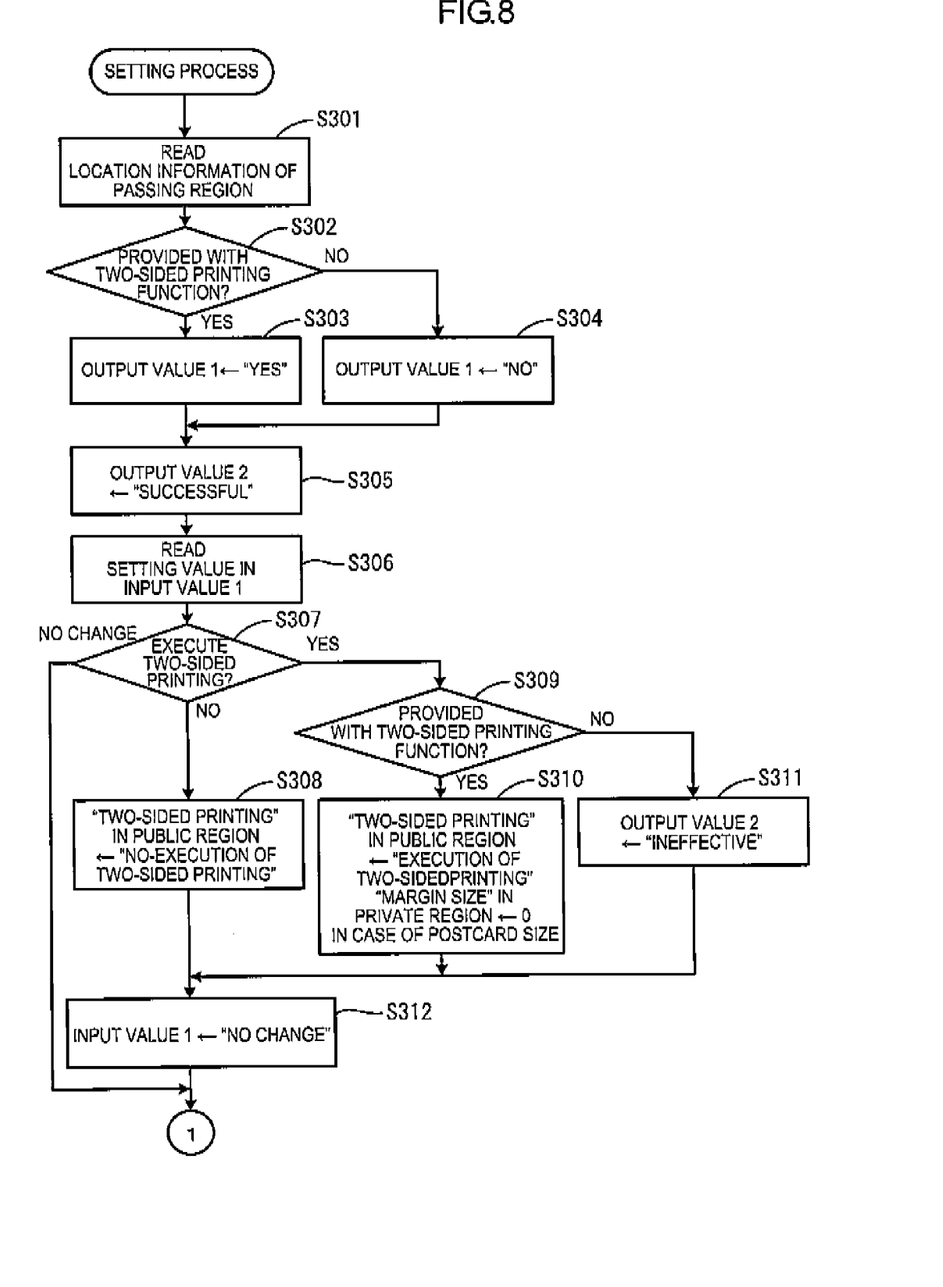
FIG. 8 is a flowchart illustrating a flow of a setting process.

At step S301, the printer driver 31 reads the location information of the passing region from the end of the DEVMODE data structure 40.

In the processes of the steps S302 to S304, the setting value representing if the printer 2 is capable of the two-sided printing function is written in the output value 1 of the DEVMODE data structure 40.

At step S302, the printer driver 31 determines if the printer 2 is capable of with the two-sided printing function. If the determination is affirmative, the process proceeds to step S303. If the determination is negative, the process proceeds to step S304.

The printer driver 31 is programmed for each type of printers 2 and has information of printing functions of the printer 2 acceptable for the printer driver 31.

At step S303, the printer driver 31 writes "Yes" in the output value 1 of the passing region 42.

At step S304, the printer driver 31 writes "No" in the output value 1 of the passing region 42.

In the steps S305 to S319, based on the setting value written in the input value 1 and the setting value written in the input value 2, it is determined if the setting values are "effective", and the determination result is written in the output value 2 of the passing region 42.

At step S305, the printer driver 31 writes in the output value 2 of the passing region 42 "effective" as an initial value of the determination result.

At step S306, the printer driver 31 reads from the passing region 42 the setting value of the input value 1 that represents if the two-sided printing is executed.

At step S307, if the setting value of the input value 1 is "no-execution of two-sided printing", the process proceeds to step S308. If the setting value of the input value 1 is "execution of two-sided printing", the process proceeds to step S309. If the setting value of the input value 1 is "no change", nothing is executed and the process proceeds to step S313.

In the following case, "no change" is set in the input value 1. The setting process is called every time when an operation is executed for the two-sided printing field 50b and for the borderless printing field 50c. Therefore, if an operation is executed for the borderless printing field 50c first, "no change" that is a default value is set in the input value 1. If "no change" is set in the input value 1, the processes of steps S308 to S312 are not necessary. Therefore, the printer driver 31 skips the processes of steps S308 to S312 and proceeds to step S313.

At step S308, the printer driver 31 writes "no-execution of two-sided printing" in the "two-sided printing" 43b of the Public region 43.

At step S309, the printer driver 31 determines if the printer 2 is capable of the two-sided printing function. If the determination is affirmative, the process proceeds to step S310. If the determination is negative, the process proceeds to step S311.

It is determined if the printer 2 is capable of the two-sided printing function at step S309 due to the following reasons.

If the printer 2 is not capable of the two-sided printing function, the two-sided printing field 50b is not displayed at step S106 in the display process. Therefore, a user cannot check or clear the checkbox of the two-sided printing field 50b, and the value of the input value 1 is supposed to be "no change". Therefore, if the printer 2 is not capable of the two-sided printing function, the process does not proceed to step S309. However, some application may display the two-sided printing filed 50b on the application print setting screen 50 without confirming if the printer is capable of the two-sided printing function. Such application may display the two-sided printing field 50b on the application print setting screen 50 although the printer 2 is not capable of the two-sided printing function, and a user may select execution of the two-sided printing. Accordingly, "execution of two-sided printing" is set in the input value 1. Therefore, the printer driver 31 reconfirms if the printer is capable of the two-sided printing function at step S309.

At step 309, it is determined if the printer 2 is capable of the two-sided printing function and also determined if the set paper size is acceptable for the two-sided printing. Some of paper sizes may not be acceptable for the two-sided printing. For example, "postcard" or "A4" may be acceptable and "A3" may not be acceptable for the two-sided printing. In such a case, if the printer 2 is capable of the two-sided printing function and the paper size stored in the "paper size" 43a of the Public region 43 is "postcard" or "A4", it may be determined that the printer 2 is capable of the two-sided printing function.

At step S310, the printer driver 31 determines that the setting value of the input value 1 is an effective print condition and writes "execution of two-sided printing" in the "two-sided printing" 43b of the public region 43. "Effective" is set in the output value 2 as a default value of the determination result at step S305.

Then, the printer driver 31 determines if the paper size stored in the "paper size" 43a of the Public region 43 is "postcard". If determined that the paper size is "postcard", the printer driver 31 writes "0 mm" in the "margin size" 41a of the Private region 41.

At step S311, the printer driver 31 determines that the setting value of the input value is not an effective print condition and writes "ineffective" in the output value 2 of the passing region 42 as a determination result.

Since the setting value relating to the input value 1 is set in the Public region 43 or the Private region 41 based on the setting values of the input value 1, the output value 1 and the output value 2, the printer driver 31 returns the setting value in the input value 1 to "no change" at step S312.

At step S313, the printer driver 31 reads the setting value in the input value 2 of the passing region 42.

At step S314, if the setting value in the input value 2 is "no-execution of borderless printing", the process proceeds to step S315. If the setting value in the input value 2 is "execution of borderless printing", the process proceeds to step S316. If the setting value in the input value 2 is "no change", nothing is executed and the process proceeds to step S320.

At step S315, the printer driver 31 writes in the "borderless printing" 41b of the Private region 41 "no-execution of borderless printing".

At step S316, the printer driver 31 determines if the printer 2 is capable of the borderless printing function. If the determination is affirmative, the process proceeds to step S317. If the determination is negative, the process proceeds to step S318.

At step S316, it is determined if the printer 2 is capable of the borderless printing function and also determined if the set paper size is acceptable for the borderless printing. Some print sizes may not be acceptable for the borderless printing. For example, "A4" may be acceptable for the borderless printing and "A3" may not be acceptable. Therefore, if the printer 2 is capable the borderless printing function and the paper size stored in the "paper size" 43a of the Public region 43 is "A4", it may be determined that the printer 2 is capable of the borderless printing function.

At step S317, the printer driver 31 determines that the setting value in the input value 2 is an effective print condition and writes "execution of borderless printing" in the "borderless printing" 41b of the Private region 41. "Effective" is set in the output value 2 as the default value at step S312.

At step S318, the printer driver 31 determines that the setting value in the input value 2 is not an effective print condition and writes "ineffective" in the output value 2 of the passing region 42 as a reflected result.

Since the setting value relating to the input value 2 is set in the Public region 43 or the Private region 41 based on the setting values of the input value 2 and the output value 2, the printer driver 31 returns the setting value in the input value 2 of the passing region 42 to "no change" at step S319.

At step S320, the printer driver 31 determines if the value in the output value 2 of the passing region 42 that represents a determination result is successful or false. If the determination result is false, the process proceeds to step S321. If the determination result is successful, the process is terminated.

At step S321, the printer driver 31 returns the setting values set in the regions other than the passing region 42 in this process to original values.

In the illustrative aspect, it is determined if the setting value written in the input value 1 or the input value 2 by the application 32 is effective or not. If it is available, the setting value is written in the Private region 41. If it is unavailable, the setting value is not written in the Private region 41. However, the setting value written in the input value 1 or the input value 2 by the application may be set in the Private region 41 without determining if the setting value is effective or not.

For example, if the setting value is validated by the application 32 so that only an effective setting value is written in the Private region 41, the printer driver 31 may write the setting value in the Private region 41 without determining if the setting value is effective or not.

(6) Effects of Illustrative Aspect

The specification for the private region 41 is not open to public and therefore the print condition stored in the Private region 41 may not be changed through the application 32. According to the printer driver 31 of the illustrative aspect, the application 32 writes the print condition in the input value 1 and the input value 2 of the passing region 42, and the application 32 can change the print condition stored in the Private region 41.

Specifically, after the application 32 writes the input value in the passing region 42, the application 32 calls the Document Properties Function, that is an API provided by the OS, at step S102. This makes the printer driver 31 execute the setting process for the input value written in the passing region 42.

Therefore, according to the printer driver 31, the printer driver 31 is not required to implement the API to change the print condition stored in the Private region 41 through the application 32, and the print condition can be changed through the application 32. Accordingly, even if the 32-bit application is operated on the 64-bit OS, the print condition stored in the Private region 41 can be changed.

Further, according to the printer driver 31, since the passing region 42 is provided in the Private region 41, the region in which the application writes a print condition is provided in the DEVMODE data structure 40.

Further, according to the printer driver 31, if the print condition written in the passing region 42 is related to both of the print condition stored in the Public region 43 and the print condition stored in the Private region 41, the setting values of the print condition stored in the Private region 41 and the Public region 43 are set based on the print condition written in the passing region 42. Therefore, this reduces inconsistency or mismatch between the print condition stored in the Private region 41 and the print condition stored in the Public region 43.

Further, according to the printer driver 31, it is determined if the print condition written in the passing region 42 by the application 32 is an effective print condition. If it is determined that the print condition is an effective print condition, the setting values are set in the Private region 41 and the Public region 43 based on the effective print condition, and the determination result representing that the determination result is successful is written in the passing region 42. If it is determined that the print condition is not an effective print condition, the determination result representing that the determination result is false is written in the passing region 42. Therefore, application 32 can be informed if the print condition written in the passing region 42 is effective or ineffective.

Further, according to the printer driver 31, the print function information representing if the printer 2 is capable of the two-sided printing function is written in the output value 1 of the passing region 42. Therefore, the application 32 can be informed if the printer 2 is capable of the two-sided printing function.

Further, according to the printer driver 31, the location information representing the location of the passing region 42 in the DEVMODE data structure 40 is described at the end of the DEVMODE data structure 40. Therefore, the application 32 reads the location information from the end of the DEVMODE data structure 40 so as to be able to know the location of the passing region 42.

Further, according to the print program 30, the application 32 reads the value in the output value 1 of the passing region. If the printer 2 is capable of the two-sided printing function, the application print setting screen 50 is displayed. A user sets the print condition related to the two-sided printing function from the application print setting screen 50.

<Other Illustrative Aspects>

The scope of the present invention is not limited to the aspects explained in the above description made with reference to the drawings. The following aspects may be included in the technical scope of the present invention.

(1) The setting value only in the Public region 43 may be set based on the setting value written in the passing region 42. Although the setting value for the print quality is stored in the Public region 43, the setting value for the print quality may not be desired to be changed through the application 32 due to the relation to the setting value in other print setting item. In such a case, the input value in which a setting value for the print quality is written by the application 32 may be provided in the passing region 42, and the setting value in the "print quality" 43c in the Public region 43 may be set based on the setting value written in the input value by the printer driver 31.

In case of setting the setting value only in the Public region 43 based on the setting value written in the passing region 42, the Public region 43 corresponds to an example of the first region. In such a case, the passing region 42 that corresponds to the second region is not provided in the first region.

(2) In the above illustrative aspect, a printing operation is explained as an example of the image formation. Display of a print preview on the display device 17 may be an example of the image formation.

(3) In the above illustrative aspects, the print conditions stored in the Public region 43 and the Private region 41 are changed from the application 32. However, if the default value is not set in the DEVMODE data structure, the setting value is not changed but may be newly stored in the Public region 43 and the Private region 41

(4) In the above illustrative aspects, the print program 30 including the printer driver 31 and the application program 32 is executed by the CPU 11. However, each of the printer driver 31 and the application program 32 may be executed by an independent CPU. Further, each of the modules of the printer driver 31 and the application program 32 may be executed by an independent CPU.

What is claimed is:

1. A non-transitory computer readable medium having stored thereon computer-executable instructions, including a printer driver, that, when executed, cause a computer to function as:

a generation module configured to generate a data structure including:

a first private region storing a first image formation condition relating to image formation functions unique to each model of image forming apparatuses, a second private region in which a second image formation condition is written by an application program; and a public region storing a third image formation condition relating to image formation functions common to a plurality of models of image forming apparatuses;

a setting module configured to:

determine whether an image forming apparatus connected to the computer is provided with a specific image forming function;

determine that the second image formation condition written in the second private region by the application program is effective upon determining that the second image formation condition matches the specific image forming function with which the image forming apparatus is provided;

determine that the second image formation condition written in the second private region by the application program is ineffective upon determining that the second image formation condition does not match the specific image forming function with which the image forming apparatus is provided;

set the second image formation condition in the second private region to the third image formation condition in the public region upon determining that the second image formation condition in the second private region is effective;

write a successful setting result to the second private region, the successful setting result indicating that setting of the second image formation condition to the third image formation condition is successful; and write a failure setting result to the second private region, the failure setting result indicating that setting of the second image formation condition to the third image formation condition is failed upon determining that the second image formation condition in the second private region is ineffective; and a production module configured to produce image formation data based on the first image formation condition stored in the first private region and the third image formation condition stored in the public region.

2. The computer readable medium according to claim 1, wherein the computer-executable instructions, including the printer driver, when executed, cause the computer to further function as:

an image forming function information writing module configured to write in the second private region image formation function information representing if the image forming apparatus is provided with the specific image forming function.

3. The computer readable medium according to claim 1, wherein location information representing a location of the second private region is described at an end of the data structure.

4. The computer readable medium according to claim 1, wherein the computer-executable instructions, including the printer driver, when executed, cause the computer to further function as:

an image forming function information writing module configured to write in the second private region image formation function information representing if the image forming apparatus is provided with the specific image forming function, and wherein the image forming function information is read from the second private region by the application program and a setting screen is displayed on a display device by the application program if the image forming apparatus is provided with the specific image forming function.

5. The computer readable medium according to claim 1, wherein the data structure is a DEVMODE data structure and the second private region is a Private region in the DEVMODE data structure.

6. The non-transitory computer readable medium of claim 1, wherein the setting module is further configured to:

determine whether another third image formation condition is set to be a predetermined condition; and set automatically another first print formation condition that is related to the effective second image formation condition to be a predetermined condition.

7. An apparatus comprising:

a processing unit; and memory for storing executable instructions that, when executed by the processing unit, cause the apparatus to function as:

a generation module configured to generate a data structure including:

a first private region storing a first image formation condition relating to image formation functions unique to each model of image forming apparatuses, a second private region in which a second image formation condition is written by an application program; and a public region storing a third image formation condition relating to image formation functions common to a plurality of models of image forming apparatuses;

a setting module configured to:

determine whether an image forming apparatus connected to the computer is provided with a specific image forming function;

determine that the second image formation condition written in the second private region by the application program is effective upon determining that the second image formation condition matches the specific image forming function with which the image forming apparatus is provided;

determine that the second image formation condition written in the second private region by the application program is ineffective upon determining that the second image formation condition does not match the specific image forming function with which the image forming apparatus is provided;

set the second image formation condition in the second private region to the third image formation condition in the public region upon determining that the second image formation condition in the second private region is effective;

write a successful setting result to the second private region, the successful setting result indicating that setting of the second image formation condition to the third image formation condition is successful; and write a failure setting result to the second private region, the failure setting result indicating that setting of the second image formation condition to the third image formation condition is failed upon determining that the second image formation condition in the second private region is ineffective; and a production module configured to produce image formation data based on the first image formation condition stored in the first private region and the third image formation condition stored in the public region.

8. The apparatus according to claim 7, wherein the executable instructions, when executed by the processing unit, cause the apparatus to further function as:

an image forming function information writing module configured to write in the second private region image formation function information representing if the image forming apparatus is provided with the specific image forming function.

9. The apparatus according to claim 7, wherein location information representing a location of the second private region is described at an end of the data structure.

10. The apparatus according to claim 7, wherein the computer-executable instruction, when executed by the processing unit, cause the apparatus to further function as:

an image forming function information writing module configured to write in the second private region image formation function information representing if the image forming apparatus is provided with the specific image forming function, and the image forming function information is read from the second private region by the application program and a setting screen is displayed on a display device by the application program if the image forming apparatus is provided with the specific image forming function.

11. The apparatus according to claim 7, wherein the data structure is a DEVMODE data structure and the second private region is a Private region in the DEVMODE data structure.

12. A method comprising:
generating, by a computing device, a data structure including:
a first private region storing a first image formation condition relating to image formation functions unique to each model of image forming apparatuses,
a second private region in which a second image formation condition is written by an application program, and
a public region storing a third image formation condition relating to image formation functions common to a plurality of models of image forming apparatuses;
determining, by the computing device, that an image forming apparatus connected to the computing device is provided with a specific image forming function;
determining, by the computing device, that the second image formation condition written in the second private region by the application program is effective upon determining that the second image formation condition matches the specific image forming function with which the image forming apparatus is provided;
setting, by the computing device, the second image formation condition in the second private region to the third image formation condition in the public region upon determining that the second image formation condition in the second private region is effective;
writing, by the computing device, a successful setting result to the second private region, the successful setting result indicating that setting of the second image formation condition to the third image formation condition is successful; and
producing, by the computing device, image formation data based on the first image formation condition stored in the first private region and the third image formation condition stored in the public region.

13. The method according to claim 12, wherein the data structure is a DEVMODE data structure and the second private region is a Private region in the DEVMODE data structure.

* * * * *